United States Patent
Pinarbasi

(10) Patent No.: US 6,317,299 B1
(45) Date of Patent: Nov. 13, 2001

(54) SEED LAYER FOR IMPROVING PINNING FIELD SPIN VALVE SENSOR

(75) Inventor: Mustafa Pinarbasi, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/505,515

(22) Filed: Feb. 17, 2000

(51) Int. Cl.[7] ............................................ G11B 5/39
(52) U.S. Cl. .................................. 360/324.11; 360/324.1
(58) Field of Search ............................ 360/324.1, 324.11

(56) References Cited

U.S. PATENT DOCUMENTS

| | | | |
|---|---|---|---|
| 6,133,732 | * 10/2000 | Hayashi | 324/252 |
| 6,154,349 | * 11/2000 | Kanai et al. | 360/324.12 |
| 6,185,080 | * 2/2001 | Gill | 360/324.2 |
| 6,198,610 | * 3/2001 | Kawawake et al. | 360/324.12 |
| 6,219,210 | * 4/2001 | Pinarbasi | 360/324.11 |
| 6,222,707 | * 4/2001 | Huai et al. | 360/324.1 |
| 6,245,450 | * 6/2001 | Kawawake et al. | 428/692 |

* cited by examiner

*Primary Examiner*—Jefferson Evans
(74) *Attorney, Agent, or Firm*—Ervin F. Johnston

(57) ABSTRACT

A seed layer is provided for a pinning layer which increases the pinning field $H_{PIN}$ between a pinning layer and a pinned layer of a spin valve sensor. In an example the seed layer structure included a first seed layer of cobalt iron boron (CoFeB), a second seed layer of nickel manganese oxide (NiMnO) and a third seed layer of aluminum oxide ($Al_2O_3$) with the first seed layer interfacing the pinning layer and the second seed layer being located between the first and third seed layers. A pinning field between the pinning and pinned layers was 600 Oe and the magnetoresistive coefficient of the spin valve sensor was 8.8%. The pinned layer can be a single pinned layer or an antiparallel (AP) pinned layer structure. If the pinned layer structure is a single pinned layer the cobalt iron boron (CoFeB) first seed layer provides a second significant function of at least partially counterbalancing the demagnetizing field from the pinned layer.

44 Claims, 7 Drawing Sheets

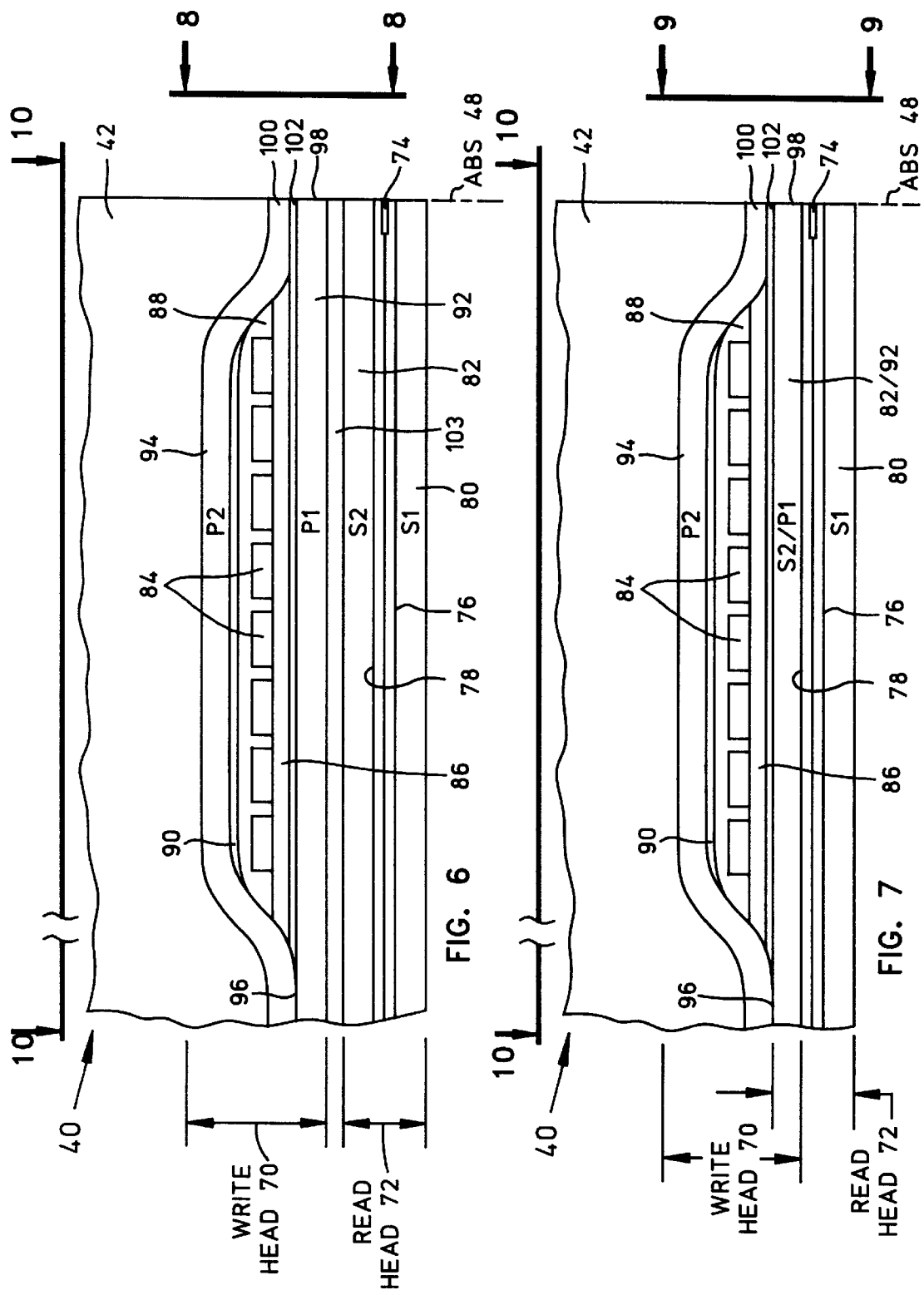

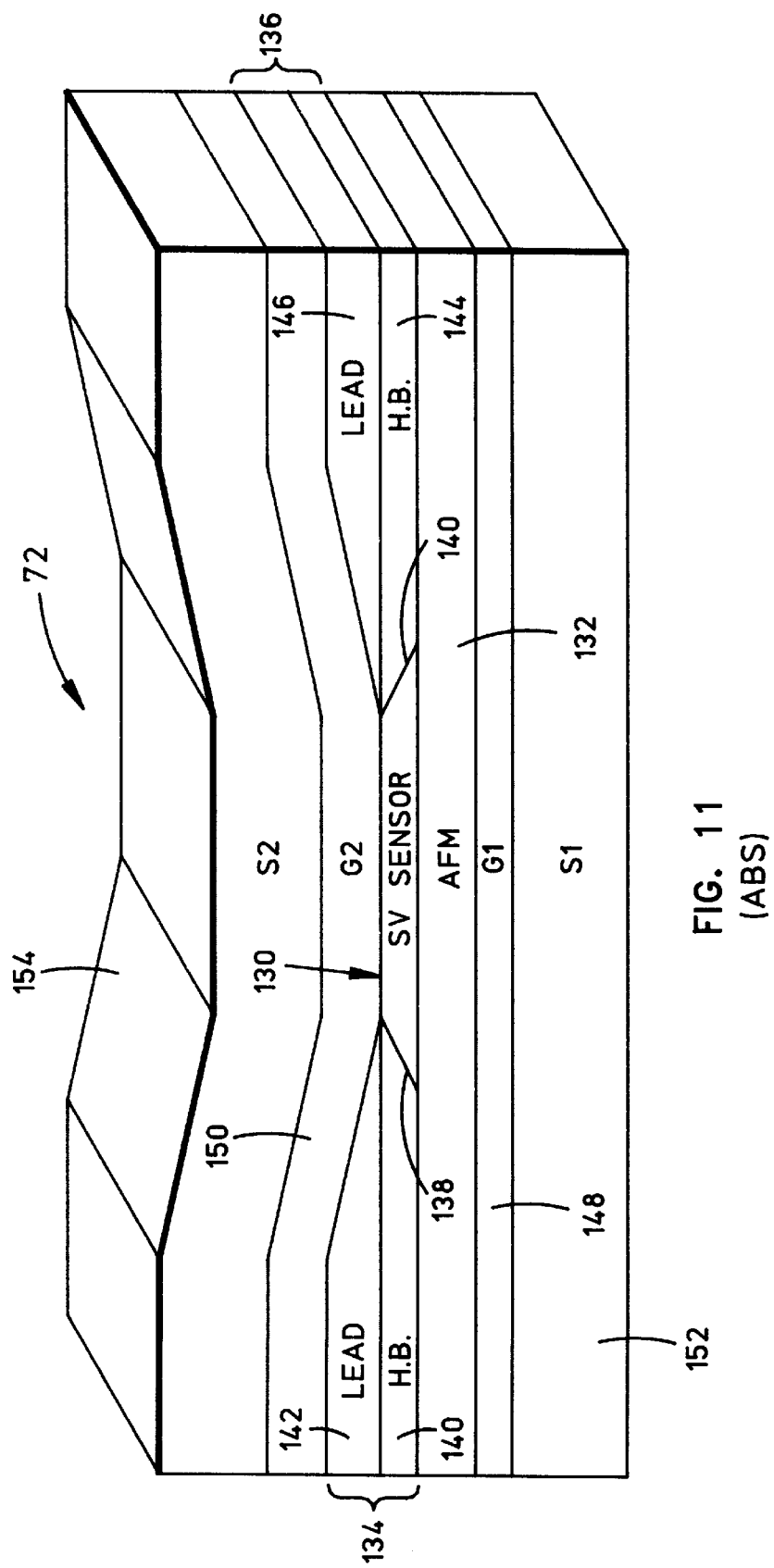
FIG. 11 (ABS)

SEED LAYER FOR IMPROVING PINNING FIELD SPIN VALVE SENSOR

BACKGROUND OF THE INVENTION

1. Field of the Invention

The present invention relates to a seed layer for improving the pinning field of a spin valve sensor and more particularly to a seed layer structure that improves the pinning field between pinning and pinned layers and promotes a higher magnetoresistive coefficient of a spin valve sensor.

2. Description of the Related Art

A spin valve sensor is employed by a read head for sensing magnetic signal fields from a moving magnetic medium, such as a rotating magnetic disk. The sensor includes a nonmagnetic electrically conductive first spacer layer sandwiched between a ferromagnetic pinned layer and a ferromagnetic free layer. An antiferromagnetic pinning layer interfaces the pinned layer for pinning a magnetic moment of the pinned layer 90° to an air bearing surface (ABS) wherein the ABS is an exposed surface of the sensor that faces the magnetic disk. First and second leads are connected to the spin valve sensor for conducting a sense current therethrough. A magnetic moment of the free layer is free to rotate upwardly and downwardly with respect to the ABS from a quiescent or bias point position in response to positive and negative magnetic field signals from a rotating magnetic disk. The quiescent position, which is preferably parallel to the ABS, is the position of the magnetic moment of the free layer with the sense current conducted through the sensor in the absence of signal fields.

The thickness of the spacer layer is chosen so that shunting of the sense current and a magnetic coupling between the free and pinned layers are minimized. This thickness is typically less than the mean free path of electrons conducted through the sensor. With this arrangement, a portion of the conduction electrons are scattered at the interfaces of the spacer layer with the pinned and free layers. When the magnetic moments of the pinned and free layers are parallel with respect to one another scattering is minimal and when their magnetic moments are antiparallel scattering is maximized. Changes in scattering changes the resistance of the spin valve sensor as a function of cos θ, where θ is the angle between the magnetic moments of the pinned and free layers. The sensitivity of the sensor is quantified as magnetoresistive coefficient dr/R where dr is the change in the resistance of the sensor as the magnetic moment of the free layer rotates from a position parallel with respect to the magnetic moment of the pinned layer to an antiparallel position with respect thereto and R is the resistance of the sensor when the magnetic moments are parallel.

A read head in a magnetic disk drive of a computer includes the spin valve sensor as well as nonconductive nonmagnetic first and second read gap layers and ferromagnetic first and second shield layers. The spin valve sensor is located between the first and second read gap layers and the first and second read gap layers are located between the first and second shield layers. In the construction of the read head the first shield layer is first formed followed by formation of the first read gap layer, the spin valve sensor, the second read gap layer and the second shield layer. Spin valve sensors are classified as a top or a bottom spin valve sensor depending upon whether the pinning layer is located at the bottom of the sensor next to the first read gap layer or at the top of the sensor closer to the second read gap layer. Spin valve sensors are further classified as simple pinned or antiparallel pinned depending upon whether the pinned layer structure is one or more ferromagnetic layers with a unidirectional magnetic moment or a pair of ferromagnetic layers that are separated by a coupling layer with magnetic moments of the ferromagnetic layers being antiparallel. Spin valve sensors are still further classified as single or dual wherein a single spin valve sensor employs only one pinned layer and a dual spin valve sensor employs two pinned layers with the free layer structure located therebetween.

Because of the interfacing of the pinning and pinned layers the pinned layer is exchange coupled to the pinning layer. A unidirectional orientation of the magnetic spins of the pinning layer pins the magnetic moment of the pinned layer in the same direction. The orientation of the magnetic spins of the pinning layer are set by applying heat close to or above a blocking temperature of the material of the pinning layer in the presence of a field that is directed perpendicular to the ABS. The blocking temperature is the temperature at which all of the magnetic spins of the pinning layer are free to rotate in response to an applied field. During the setting, the magnetic moment of the pinned layer is oriented parallel to the applied field and the magnetic spins of the pinning layer follow the orientation of the pinned layer. When the heat is reduced below the blocking temperature the magnetic spins of the pinning layer pin the orientation of the magnetic moment of the pinned layer. The pinning function is effective as long as the temperature remains substantially below the blocking temperature.

In the presence of some magnetic fields the magnetic moment of the pinned layer can be rotated antiparallel to the pinned direction. The question then is whether the magnetic moment of the pinned layer will return to the pinned direction when the magnetic field is relaxed. This depends upon the strength of the exchange coupling field and the coercivity of the pinned layer. If the coercivity of the pinned layer exceeds the exchange coupling field between the pinning and pinned layers the exchange coupling field will not be strong enough to bring the magnetic moment of the pinned layer back to the original pinned direction. Until the magnetic spins of the pinning layer are reset the read head is rendered inoperative. Accordingly, there is a strong felt need to increase the exchange coupling field between the pinning layer and the pinned layer so that the spin valve sensor has improved thermal stability.

Another parameter that indicates the performance of the pinning of the pinned layer is the pinning field $H_p$ between the pinning and pinned layers. The pinning field, which is somewhat dependent upon the exchange coupling field $H_{ex}$, is the applied field at which the magnetic moment of the pinned layer commences to rotate in a substantial manner. If the pinning field $H_p$ is low the orientation of the pinned layer will not be controlled thereby degrading performance of the read head. Accordingly, it is desirable to maximize the pinning field $H_p$.

SUMMARY OF THE INVENTION

I have provided a seed layer structure for the pinning layer which increases the pinning field $H_{PIN}$ between the pinning layer and the pinned layer. In an example, which will be described in detail hereinafter, I obtained a pinning field $H_{PIN}$ of 600 Oe which is excellent in the spin valve sensor art. In the example the seed layer structure included a first seed layer of cobalt iron boron (CoFeB), a second seed layer of nickel manganese oxide (NiMnO) and a third seed layer of aluminum oxide ($Al_2O_3$) with the first seed layer interfacing the pinning layer and the second seed layer being located between the first and third seed layers. My invention also includes employing a seed layer structure which includes only the first seed layer of cobalt iron boron (CoFeB) since it directly interfaces the pinning layer and is primarily responsible for the improvement in the pinning field $H_{PIN}$. The pinned layer can be a single pinned layer or an antiparallel (AP) pinned layer structure. The cobalt iron boron (CoFeB) seed layer provides a second significant function of at least partially counterbalancing the demagnetizing field from the pinned layer. Accordingly, the seed layer improves readback asymmetry of the read head by promoting a centering of a bias point of the spin valve sensor on its transfer curve. As will also be seen from the following example the spin valve sensor with the seed layer structure provided a magnetoresistive coefficient of 8.8% which is excellent in the spin valve art.

An object is to provide a seed layer for a spin valve sensor which improves the pinning field $H_{PIN}$ between pinning and pinned layers and the magnetoresistive coefficient dr/R of the sensor.

Another object is to provide a seed layer for a spin valve sensor which improves the texture of layers constructed on the seed layer for improving performance of the spin valve sensor.

A further object is to accomplish the aforementioned objectives while employing the seed layer to provide a sense current field for counterbalancing a demagnetization field from a pinned layer or pinned layer structure of the spin valve sensor.

Other objects and attendant advantages of the invention will be appreciated upon reading the following description taken together with the accompanying drawings.

BRIEF DESCRIPTION OF THE DRAWINGS

FIG. 6 is a partial view of the slider and a piggyback magnetic head as seen in plane 6—6 of FIG. 2;

FIG. 7 is a partial view of the slider and a merged magnetic head as seen in plane 7—7 of FIG. 2;

FIG. 11 is an isometric ABS illustration of an exemplary read head which employs a spin valve sensor longitudinally biased by hard biasing layers;

DESCRIPTION OF THE PREFERRED EMBODIMENTS

Magnetic Disk Drive

Figure 1:
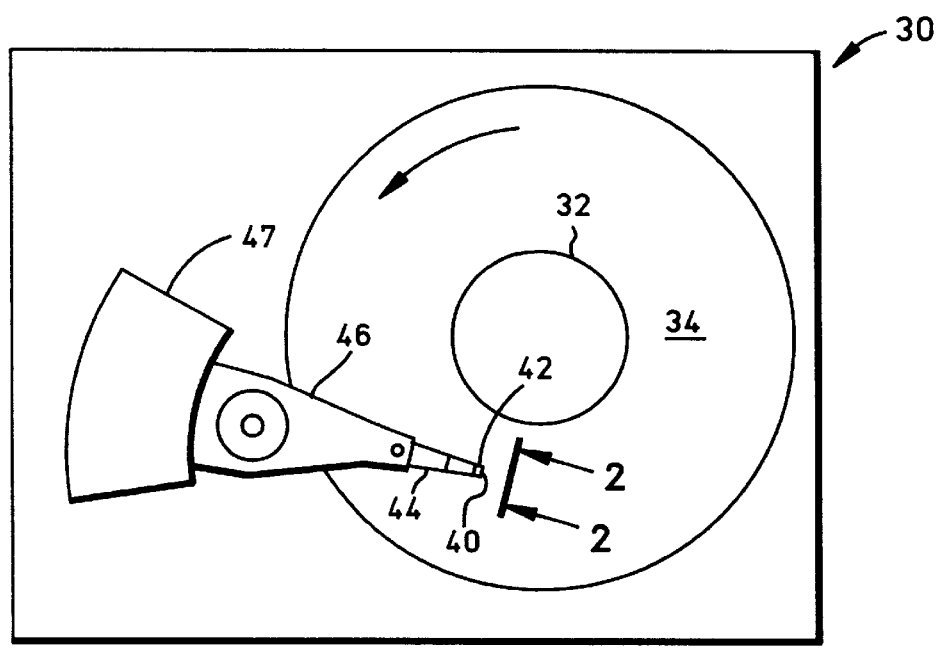
FIG. 1 is a planar view of an exemplary magnetic disk drive.
Figure 2:
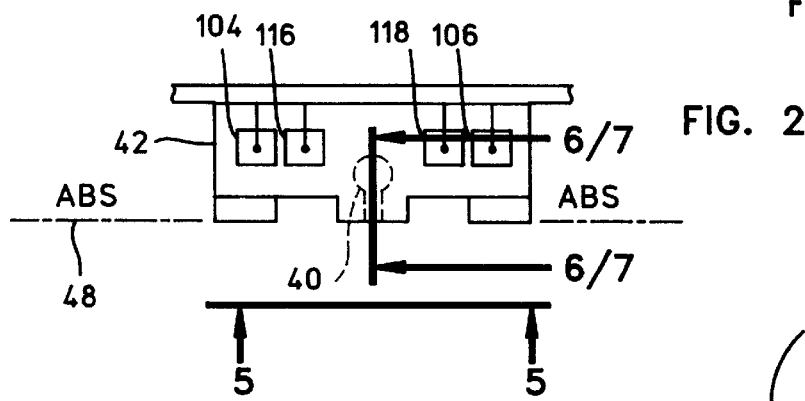
FIG. 2 is an end view of a slider with a magnetic head of the disk drive as seen in plane 2—2.
Figure 3:
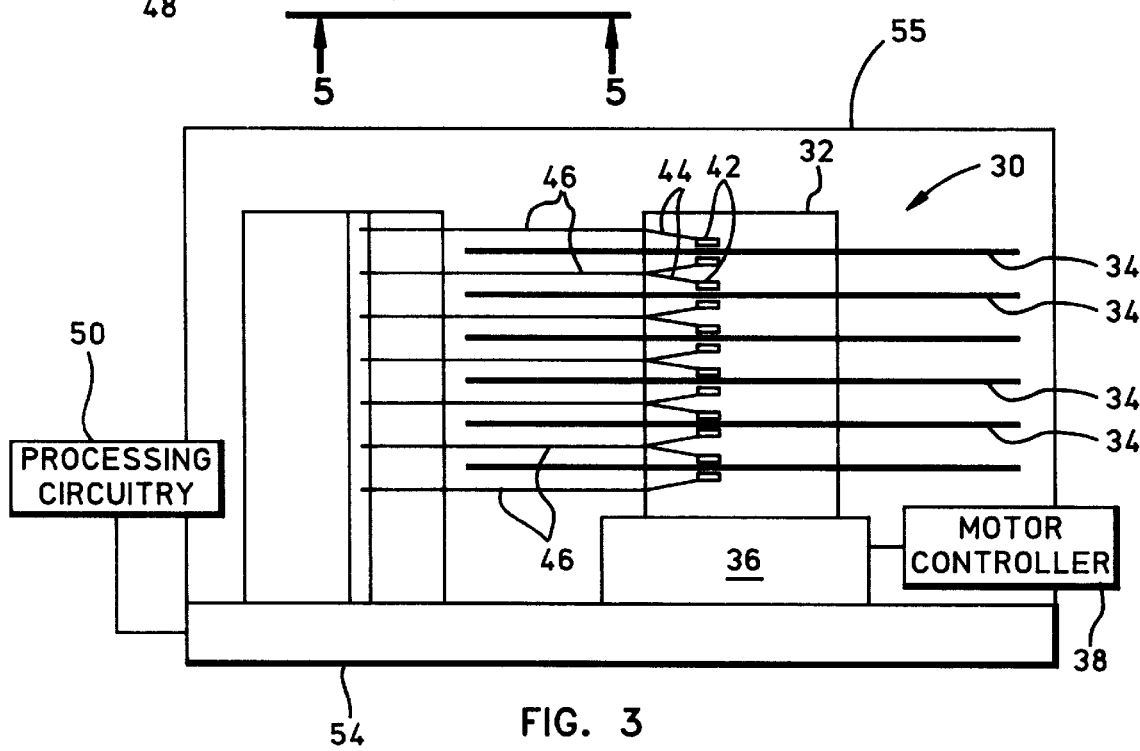
FIG. 3 is an elevation view of the magnetic disk drive wherein multiple disks and magnetic heads are employed.
Figure 4:
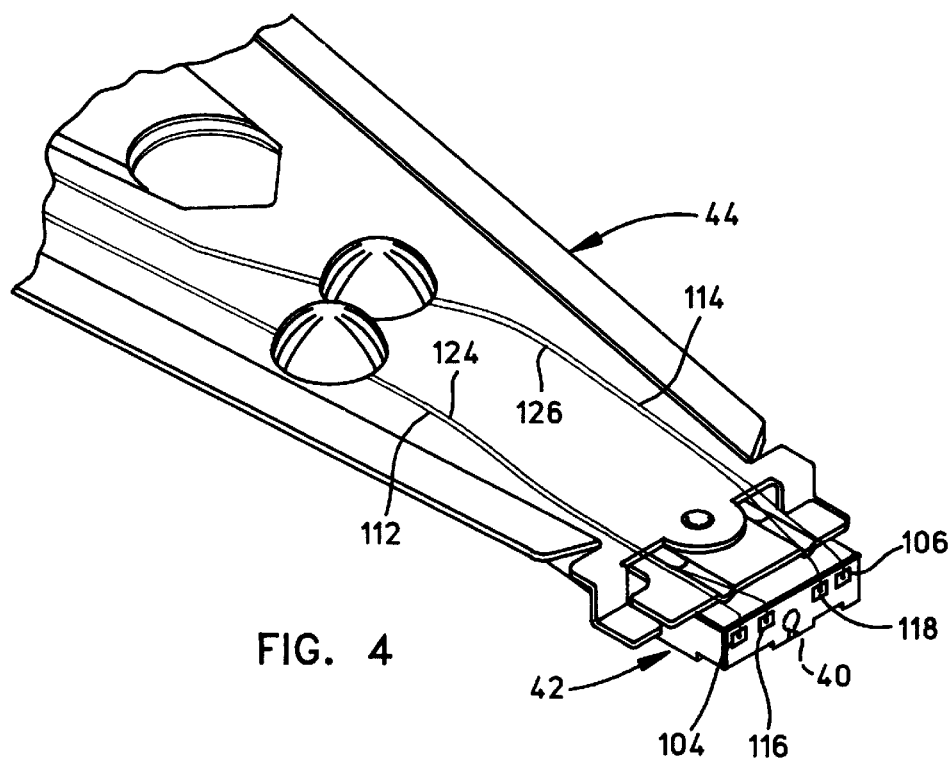
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 supports a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.05 µm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing 55, as shown in FIG. 3.

Figure 5:
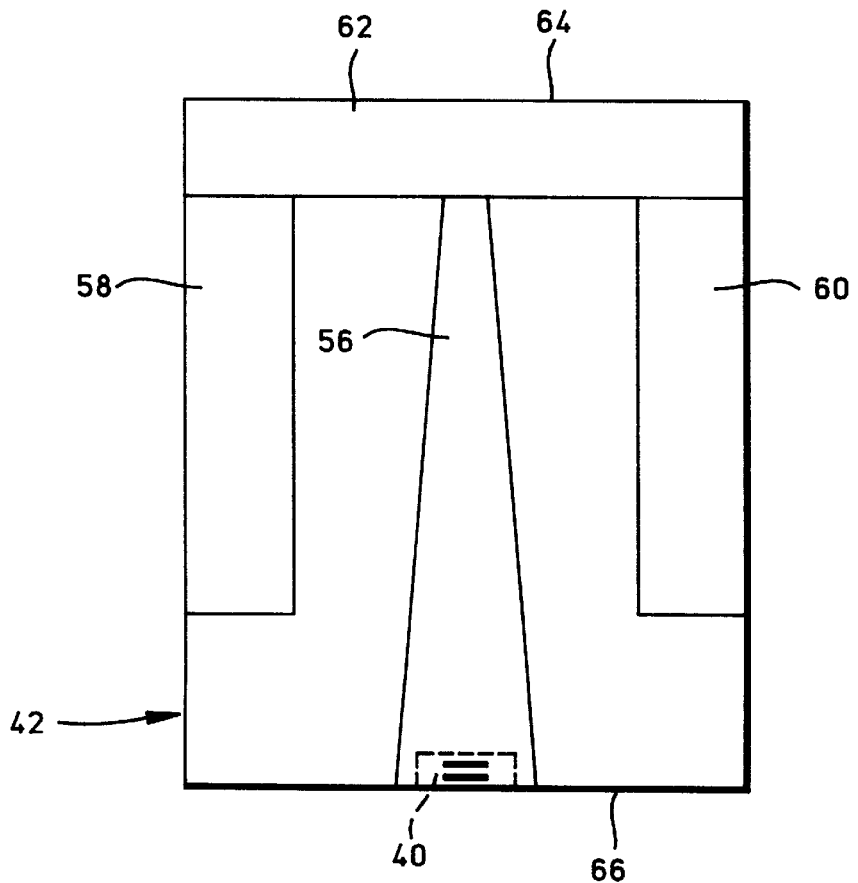
FIG. 5 is an ABS view of the slider taken along plane 5—5 of FIG. 2.

FIG. 5 is an ABS view of the slider 42 and the magnetic head 40. The slider has a center rail 56, which supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 8:
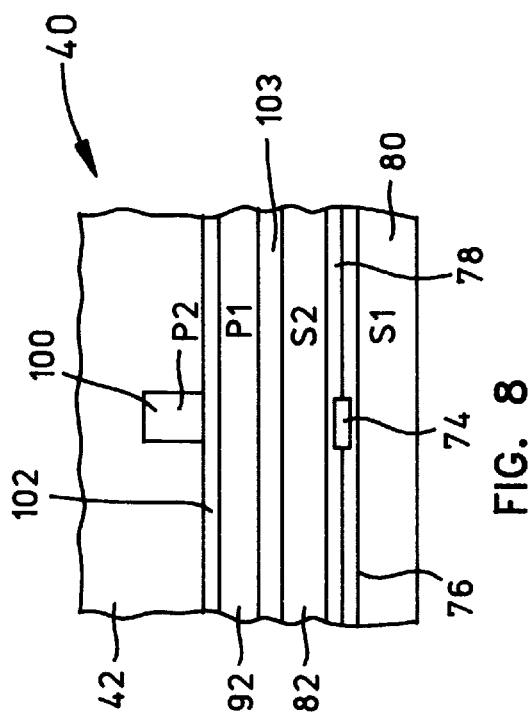
FIG. 8 is a partial ABS view of the slider taken along plane 8—8 of FIG. 6 to show the read and write elements of the piggyback magnetic head.

FIG. 6 is a side cross-sectional elevation view of a piggyback magnetic head 40, which includes a write head portion 70 and a read head portion 72, the read head portion employing a spin valve sensor 74 of the present invention. FIG. 8 is an ABS view of FIG. 6. The spin valve sensor 74 is sandwiched between nonmagnetic electrically insulative first and second read gap layers 76 and 78, and the read gap layers are sandwiched between ferromagnetic first and second shield layers 80 and 82. In response to external magnetic fields, the resistance of the spin valve sensor 74 changes. A sense current $I_s$ conducted through the sensor causes these resistance changes to be manifested as potential changes. These potential changes are then processed as readback signals by the processing circuitry 50 shown in FIG. 3.

Figure 10:
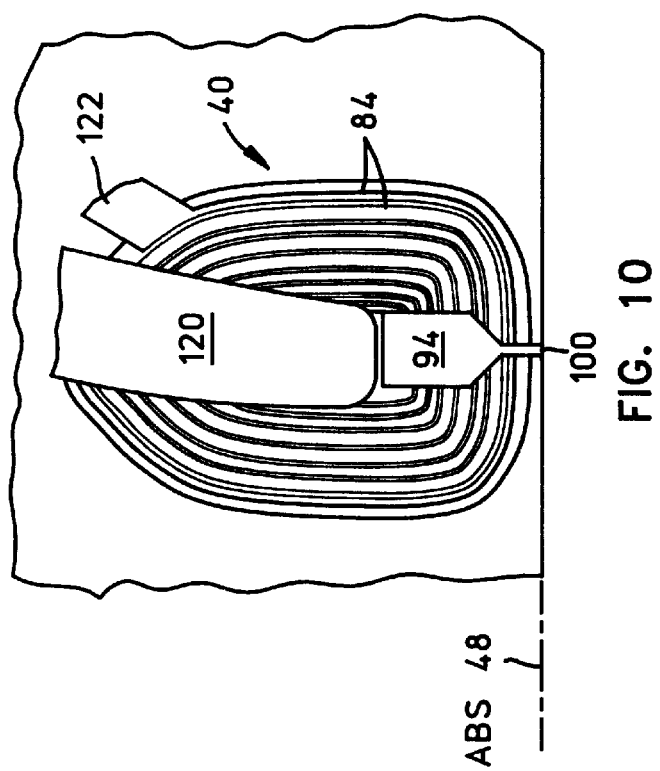
FIG. 10 is a view taken along plane 10—10 of FIGS. 6 or 7 with all material above the coil layer and leads removed.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. An insulation layer 103 is located between the second shield layer 82 and the first pole piece layer 92. Since the second shield layer 82 and the first pole piece layer 92 are separate layers this head is known as a piggyback head. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 10) to leads 124 and 126 on the suspension.

Figure 9:
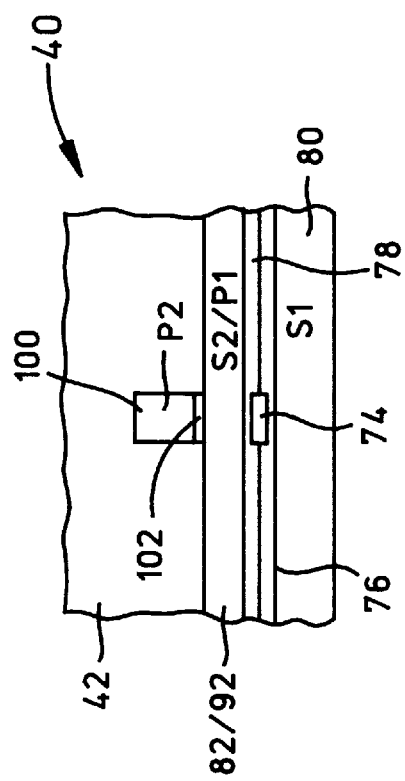
FIG. 9 is a partial ABS view of the slider taken along plane 9—9 of FIG. 7 to show the read and write elements of the merged magnetic head.

FIGS. 7 and 9 are the same as FIGS. 6 and 8 except the second shield layer 82 and the first pole piece layer 92 are a common layer. This type of head is known as a merged magnetic head. The insulation layer 103 of the piggyback head in FIGS. 6 and 8 is omitted.

FIG. 11 is an isometric ABS illustration of a read head 72 which has a spin valve sensor 130 with a pinning layer 132 which is typically nickel oxide (NiO). First and second hard bias and lead layers 134 and 136 are connected to first and second side edges 138 and 140 of the spin valve sensor. This connection is known in the art as a contiguous junction and is fully described in commonly assigned U. S. Pat. No. 5,018,037. The first hard bias and lead layers include a first hard bias layer 140 and a first lead layer 142 and the second hard bias and lead layers 136 include a second hard bias layer 144 and a second lead layer 146. The hard bias layers 140 and 144 cause magnetic flux to extend longitudinally through the spin valve sensor 130 for stabilizing magnetic domains of the free layer. The spin valve sensor 130 and the first and second hard bias and lead layers 134 and 136 are located between nonmagnetic electrically insulative first and second read gap layers 148 and 150. The first and second read gap layers 148 and 150 are, in turn, located between first and second shield layers 152 and 154.

The Invention

Figure 12:
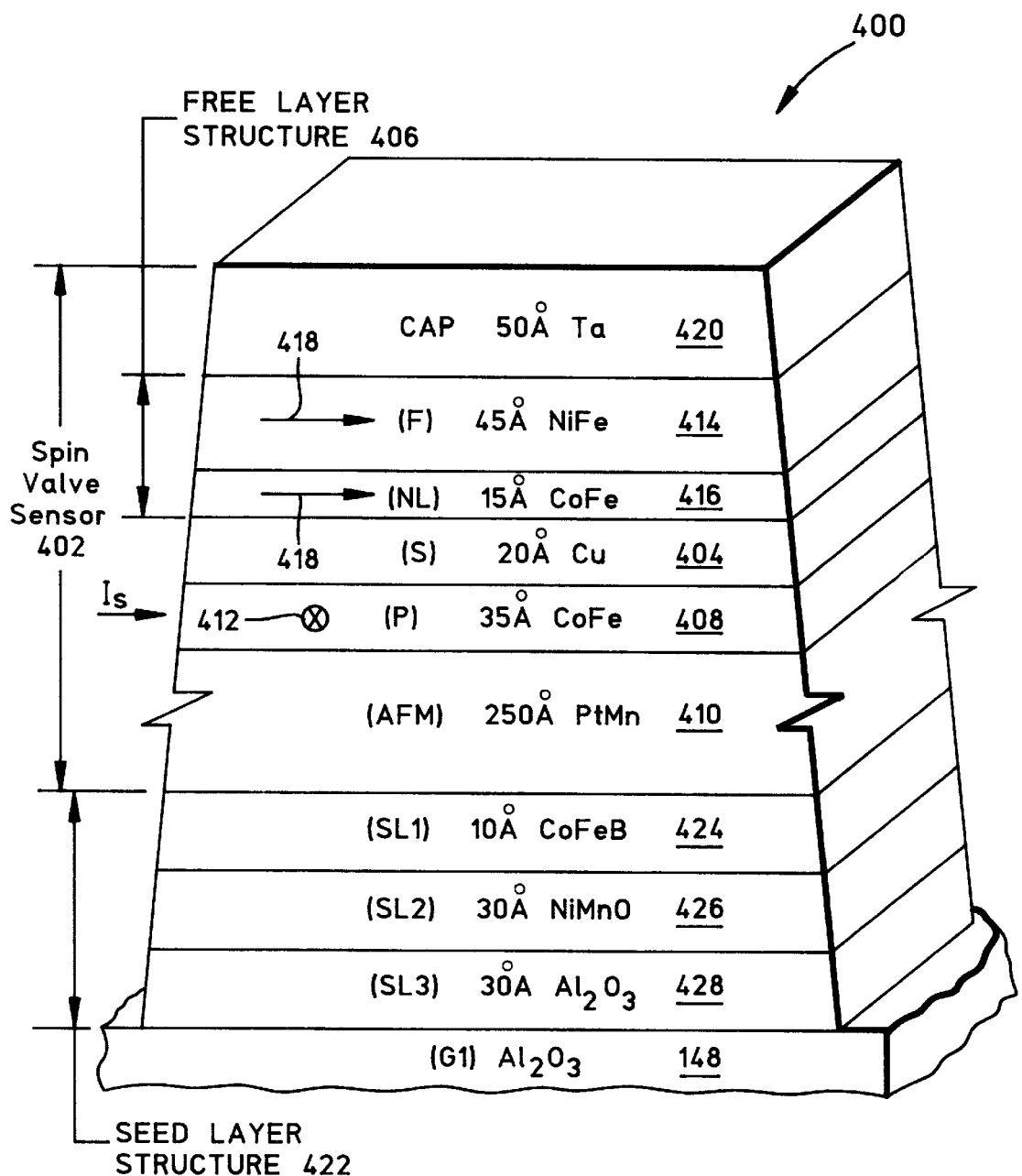
FIG. 12 is an ABS illustration of a first embodiment of the present spin valve sensor.

The read head embodiment 400 shown in FIG. 12 includes a spin valve sensor 402 which may be constructed on the first read gap layer 148. The spin valve sensor 402 includes a nonmagnetic conductive spacer layer (S) 404 which is located between a free layer structure 406 and a pinned layer (P) 408. The pinned layer 408 is exchange coupled to an antiferromagnetic (AFM) pinning layer 410. The pinning layer 410 pins a magnetic moment 412 of the pinned layer perpendicular to the ABS in a direction away from the ABS, as shown in FIG. 12, or optionally toward the ABS.

The free layer structure 406 includes a free layer (F) 414 and a nanolayer (NL) 416 with the nanolayer located between the spacer layer 404 and the free layer 414 for increasing the magnetoresistive coefficient dr/R of the spin valve sensor. The free layer structure has a magnetic moment 418 which is directed parallel to the ABS from left to right, as shown in FIG. 12, or optionally from right to left. The magnetic moment 418 is rotated upwardly and downwardly by signal fields from the rotating magnetic disk. When the sense current Is is conducted through the spin valve sensor a rotation of the magnetic moment 418 upwardly decreases the resistance of the sensor and a rotation of the magnetic moment 418 downwardly increases the resistance of the sensor which resistance changes are processed as playback signals by the processing circuitry 50 in FIG. 3. A cap layer 420 is located on the free layer 414 for protecting it from subsequent processing steps.

A seed layer structure 422 was provided for the spin valve sensor which included 10 Å of cobalt iron boron (CoFeB) for a first seed layer 424, 30 Å of nickel manganese oxide (NiMnO) for a second seed layer 426 and 30 Å of aluminum oxide ($Al_2O_3$) for a third seed layer 428 with the second seed layer located between the first and third seed layers. The spin valve sensor 402 is located on the seed layer structure 422 with the pinning layer 410 interfacing the first seed layer 424.

The thicknesses and materials of the layers of the spin valve sensor 402 are 250 Å of platinum manganese (PtMn) for the pinning layer 410, 35 Å of cobalt iron (CoFe) for the pinned layer 408, 20 Å of copper (Cu) for the spacer layer 404, 15 Å of cobalt iron (CoFe) for the nanolayer 416, 45 Å of nickel iron (NiFe) for the free layer 414 and 50 Å of tantalum (Ta) for the cap layer 420.

Upon testing the embodiment 400 shown in FIG. 12 the magnetoresistive coefficient dr/R of the spin valve sensor was 8.8% and the pinning field $H_{PIN}$ between the pinning layer 410 and the pinned layer 408 was 600 Oe. Both of these values are considered to be excellent in the spin valve sensor art.

Figure 13:
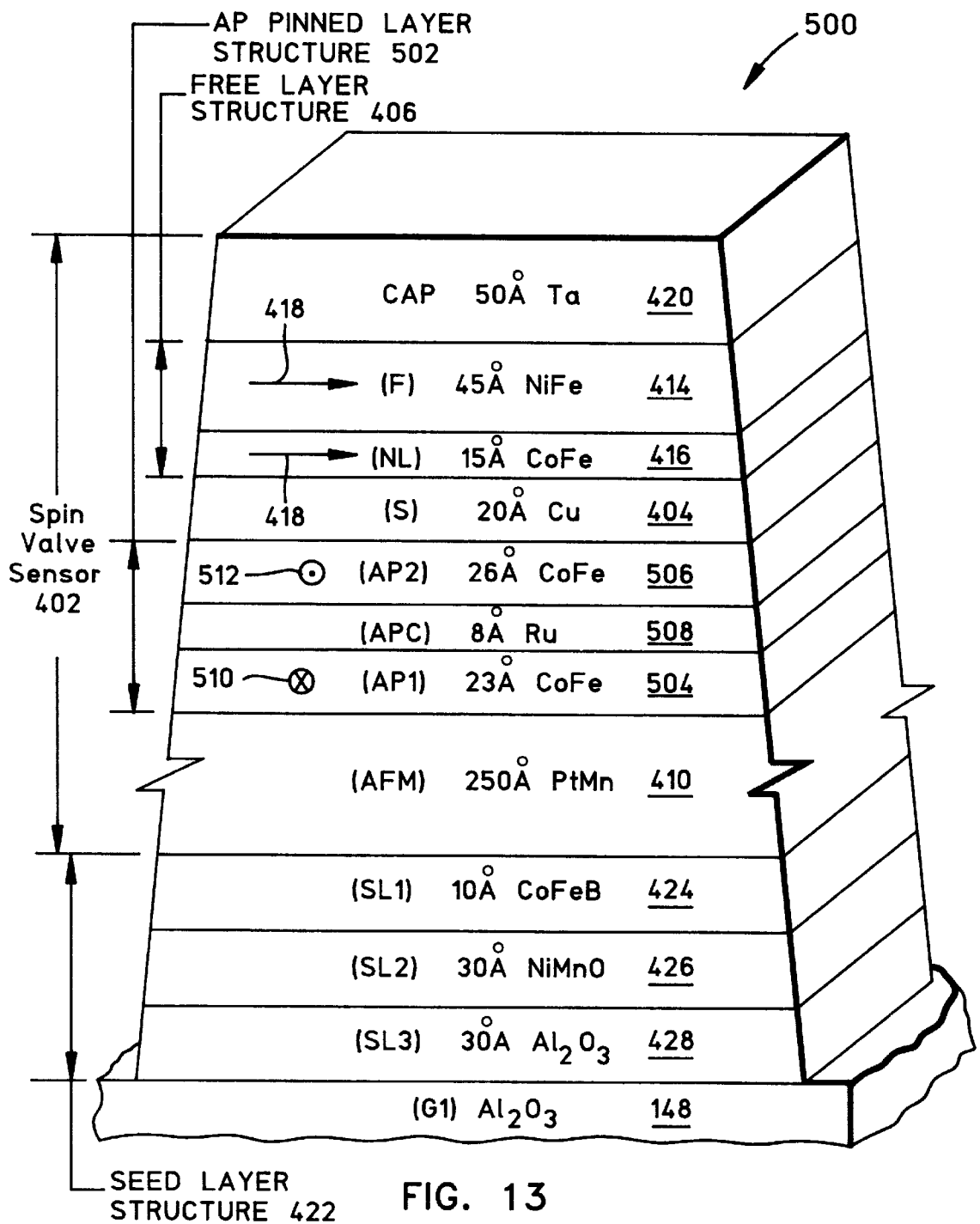
FIG. 13 is an ABS illustration of a second embodiment of the present spin valve sensor.

Another embodiment of the present invention is illustrated in FIG. 13 which is same as the embodiment 400 in FIG. 12 except an antiparallel (AP) pinned layer structure 502 is substituted for the pinned layer 408 in FIG. 12. The AP pinned layer structure 502 includes first and second AP pinned layers (AP1) and (AP2) 504 and 506 with an AP coupling layer 508 located between the first and second AP pinned layers. The first and second AP pinned layers 506 and 508 have first and second magnetic moments 510 and 512 which are antiparallel with respect to one another. Because of this relationship the AP pinned layer structure 502 produces a net demagnetizing field which is less than the demagnetizing field of the pinned layer 408 in FIG. 12. Exemplary thicknesses and materials for the AP pinned layer structure are 23 Å of cobalt iron (CoFe) for the first AP pinned layer 504, 26 Å of cobalt iron (CoFe) for the second AP pinned layer 506 and 8 Å of ruthenium (Ru) for the AP coupling layer 508.

Discussion

The percentage composition of the various elements of the materials are $Co_{88}Fe_9B_3$, $Ni_{50}Mn_{50}O$, $Pt_{50}Mn_{50}$, $Co_{90}Fe_{10}$ and $Ni_{82}Fe_{,18}$. All of the layers embodiments shown in FIGS. 12–15 were deposited in situ except for the first gap layer 148 wherein in situ means that all of the layers are deposited in a ion beam sputtering chamber without breaking the vacuum.

The spin valve sensors 402 and 502 in FIGS. 12 and 13 are bottom spin valve sensors since the pinning layer 410 is located at the bottom of the spin valve sensor closer to the first read gap layer 408 than the free layer structure 406 is to the first read gap layer. It should be understood that the thicknesses for the various layers are exemplary and can be varied. Further, while cobalt iron (CoFe) is preferred for the pinned and nanolayers, cobalt (Co) could be substituted therefor. Still further, while platinum manganese (PtMn) is preferred for the pinning layers, other metallic antiferromagnetic materials may be employed such as iridium manganese (IrMn), nickel manganese (NiMn), iron manganese (FeMn), palladium platinum manganese (PdPtMn) and nickel manganese (NiMn).

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:

1. A magnetic read head comprising:
    a spin valve sensor including:
        a ferromagnetic free layer structure that has a magnetic moment;
        a ferromagnetic pinned layer structure that has a magnetic moment;

a nonmagnetic conductive spacer layer located between the free layer structure and the pinned layer structure;
an antiferromagnetic pinning layer exchange coupled to the pinned layer structure for pinning the magnetic moment of the pinned layer structure; and
a first seed layer composed of cobalt iron boron (CoFeB);
the spin valve sensor being located on the first seed layer with the pinning layer interfacing the first seed layer.

2. A magnetic read head as claimed in claim 1 including:
nonmagnetic nonconductive first and second read gap layers;
the spin valve sensor and the seed layer structure being located between the first and second read gap layers;
ferromagnetic first and second shield layers; and
the first and second read gap layers being located between the first and second shield layers.

3. A magnetic read head as claimed in claim 2 wherein the pinning layer is platinum manganese (PtMn).

4. A magnetic read head as claimed in claim 2 including:
a second seed layer of nickel manganese oxide (NiMnO);
a third seed layer of aluminum oxide ($Al_2O_3$); and
the second seed layer being located between the first and third seed layers.

5. A magnetic read head as claimed in claim 2 wherein the pinned layer structure consists of a single ferromagnetic layer.

6. A magnetic read head as claimed in claim 5 wherein the pinning layer is platinum manganese (PtMn).

7. A magnetic read head as claimed in claim 6 including:
a second seed layer of nickel manganese oxide (NiMnO);
a third seed layer of aluminum oxide ($Al_2O_3$); and
the second seed layer being located between the first and third seed layers.

8. A magnetic read head as claimed in claim 2 wherein the pinned layer structure is an antiparallel (AP) pinned layer structure which comprises:
first and second ferromagnetic AP pinned layers; and
an AP coupling layer located between the first and second AP pinned layers.

9. A magnetic read head as claimed in claim 8 wherein the pinning layer is platinum manganese (PtMn).

10. A magnetic read head as claimed in claim 9 including:
a second seed layer of nickel manganese oxide (NiMnO);
a third seed layer of aluminum oxide ($Al_2O_3$); and
the second seed layer being located between the first and third seed layers.

11. A magnetic head assembly, comprising:
a write head including:
ferromagnetic first and second pole piece layers that have a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions;
a read head including:
a spin valve sensor;
nonmagnetic nonconductive first and second read gap layers;
the spin valve sensor being located between the first and second read gap layers;
a ferromagnetic first, hield layer; and
the first and second read gap layers being located between the first shield layer and the first pole piece layer;
the spin valve sensor including:
a ferromagnetic free layer structure that has a magnetic moment;
a ferromagnetic pinned layer structure that has a magnetic moment;
a nonmagnetic conductive spacer layer located between the free layer structure and the pinned layer structure;
an antiferromagnetic pinning layer exchange coupled to the pinned layer structure for pinning the magnetic moment of the pinned layer structure; and
a first seed layer composed of cobalt iron boron (CoFeB);
the spin valve sensor being located on the first seed layer with the pinning layer interfacing the first seed layer.

12. A magnetic head assembly as claimed in claim 11 including:
a ferromagnetic second shield layer;
a nonmagnetic isolation layer; and
the second shield layer being located between the second read gap layer and the isolation layer and the nonmagnetic isolation layer being located between the second shield layer and the first pole piece layer.

13. A magnetic head assembly as claimed in claim 11 wherein the pinned layer structure consists of a single ferromagnetic layer.

14. A magnetic head assembly as claimed in claim 13 wherein the pinning layer is platinum manganese (PtMn).

15. A magnetic head assembly as claimed in claim 14 including:
a second seed layer of nickel manganese oxide (NiMnO);
a third seed layer of aluminum oxide ($Al_2O_3$); and
the second seed layer being located between the first and third seed layers.

16. A magnetic head assembly as claimed in claim 11 wherein the pinned layer structure is an antiparallel (AP) pinned layer structure which comprises:
A first and second ferromagnetic AP pinned layers; and
an AP coupling layer located between the first and second AP pinned layers.

17. A magnetic head assembly as claimed in claim 16 wherein the pinning layer is platinum manganese (PtMn).

18. A magnetic head assembly as claimed in claim 17 including:
a second seed layer of nickel manganese oxide (NiMnO);
a third seed layer of aluminum oxide ($Al_2O_3$); and
the second seed layer being located between the first and third seed layers.

19. A magnetic disk drive including at least one magnetic head assembly that includes a write head and a read head, comprising:
the write head including:
ferromagnetic first and second pole piece layers that have a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and the first and second pole piece layers being connected at their back gap portions;
the read head including:
a spin valve sensor;
nonmagnetic nonconductive first and second read gap layers;
the spin valve sensor being located between the first and second read gap layers;
a ferromagnetic first shield layer; and
the first and second read gap layers being located between the first shield layer and the first pole piece layer;
the spin valve sensor including:
a ferromagnetic free layer structure that has a magnetic moment;
a ferromagnetic pinned layer structure that has a magnetic moment;
a nonmagnetic conductive spacer layer located between the free layer structure and the pinned layer structure;
an antiferromaonetic pinning layer exchange coupled to the pinned layer structure for pinning the magnetic moment of the pinned layer structure; and
a first seed layer composed of cobalt iron boron (CoFeB);
the spin valve sensor being located on the first seed layer with the pinning layer interfacing the first seed layer.
a housing;
a magnetic disk rotatably supported in the housing;
a support mounted in the housing for supporting the magnetic head assembly with said ABS facing the magnetic disk so that the magnetic head assembly is in a transducing relationship with the magnetic disk;
a spindle motor for rotating the magnetic disk;
an actuator positioning means connected to the support for moving the magnetic head to multiple positions with respect to said magnetic disk; and
a processor connected to the magnetic head, to the spindle motor and to the actuator for exchanging signals with the magnetic head, for controlling movement of the magnetic disk and for controlling the position of the magnetic head.

20. A magnetic disk drive as claimed in claim 19 including:
a ferromagnetic second shield layer;
a nonmagnetic isolation layer; and
the second shield layer being located between the second read gap layer and the isolation layer and the nonmagnetic isolation layer being located between the second shield layer and the first pole piece layer.

21. A magnetic disk drive as claimed in claim 19 wherein the pinned layer structure consists of a single ferromagnetic layer.

22. A magnetic disk drive as claimed in claim 21 wherein the pinning layer is platinum manganese (PtMn).

23. A magnetic disk drive as claimed in claim 22 including:
a second seed layer of nickel manganese oxide (NiMnO);
a third seed layer of aluminum oxide ($Al_2O_3$); and
the second seed layer being located between the first and third seed layers.

24. A magnetic disk drive as claimed in claim 19 wherein the pinned layer structure is an antiparallel (AP) pinned layer structure which comprises:

first and second ferromagnetic AP pinned layers; and
an AP coupling layer located between the first and second AP pinned layers.

25. A magnetic disk drive as claimed in claim 24 wherein the pinning layer is platinum manganese (PtMn).

26. A magnetic disk drive as claimed in claim 25 including:
a second seed layer of nickel manganese oxide (NiMnO);
third seed layer of aluminum oxide ($Al_2O_3$); and
the second seed layer being located between the first and third seed layers.

27. A method of making a magnetic read head that includes a spin valve sensor comprising the steps of:
making the spin valve sensor as follows:
forming a ferromagnetic free layer structure that has a magnetic moment;
forming a ferromagnetic pinned layer structure that has a magnetic moment;
forming a nonmagnetic conductive spacer layer between the free layer structure and the pinned layer structure;
forming an antiferromagnetic pinning layer exchange coupled to the pinned layer structure for pinning the magnetic moment of the pinned layer structure; and
further making the read head as follows:
forming a first seed layer composed of cobalt iron boron (CoFeB);
the making of the spin valve sensor forming the spin valve sensor on the first seed layer with the pinning layer interfacing the first seed layer.

28. A method as claimed in claim 27 including:
forming nonmagnetic nonconductive first and second read gap layers;
forming the spin valve sensor and the seed layer structure between the first and second read gap layers;
forming ferromagnetic first and second shield layers; and
forming the first and second read gap layers between the first and second shield layers.

29. A method as claimed in claim 28 wherein the pinning layer is formed of platinum manganese (PtMn).

30. A method as claimed in claim 28 including:
forming a second seed layer of nickel manganese oxide (NiMnO); and
forming a third seed layer of aluminum oxide ($Al_2O_3$) with the second seed layer located between the first and third seed layers.

31. A method as claimed in claim 28 wherein the method forms the pinned layer structure of a single ferromagnetic layer.

32. A method as claimed in claim 31 wherein the pinning layer is formed of platinum manganese (PtMn).

33. A method as claimed in claim 32 including:
forming a second seed layer of nickel manganese oxide (NiMnO); and
forming a third seed layer of aluminum oxide ($Al_2O_3$) with the second seed layer located between the first and third seed layers.

34. A method as claimed in claim 28 wherein the method forms the pinned layer structure as an antiparallel (AP) pinned layer structure which comprises the steps of:
forming first and second ferromagnetic AP pinned layers; and
forming an AP coupling layer between the first and second AP pinned layers.

35. A method as claimed in claim 34 wherein the pinning layer is formed of platinum manganese (PtMn).

36. A method as claimed in claim 35 including:
forming a second seed layer of nickel manganese oxide (NiMnO); and
forming a third seed layer of aluminum oxide (Al$_2$O$_3$) with the second seed layer located between the first and third seed layers.

37. A method of making a magnetic head assembly that includes a write head and a read head, comprising the steps of:
a making of the write head including:
forming ferromagnetic first and second pole piece layers in pole tip, yoke and back gap regions wherein the yoke region is located between the pole tip and back gap regions;
forming a nonmagnetic nonconductive write gap layer between the first and second pole piece layers in the pole tip region;
forming an insulation stack with at least one coil layer embedded therein between the first and second pole piece layers in the yoke region; and
connecting the first and pole piece layers at said back gap region;
making the read head as follows:
forming a spin valve sensor;
forming nonmagnetic nonconductive first and second read gap layers with the spin valve sensor located between the first and second read gap layers;
forming a ferromagnetic first shield layer with the first and second read gap layers located between the shield layer and the first pole piece layer;
making the spin valve sensor as follows:
forming a ferromagnetic free layer structure that has a magnetic moment;
forming a ferromagnetic pinned layer structure that has a magnetic moment;
forming a nonmagnetic conductive spacer layer between the free layer structure and the pinned layer structure;
forming an antiferromagnetic pinning layer exchange coupled to the pinned layer structure for pinning the magnetic moment of the pinned layer structure; and
further making the read head as follows:
forming a first seed layer composed of cobalt iron boron (CoFeB); and
the making of the spin valve sensor forming the spin valve sensor on the first seed layer.

38. A method as claimed in claim 37 including the steps of:
forming a ferromagnetic second shield layer;
forming a nonmagnetic isolation layer with the second shield layer between the second read gap layer and the isolation layer and the nonmagnetic isolation layer between the second shield layer and the first pole piece layer.

39. A method as claimed in claim 37 wherein the method forms the pinned layer structure of a single ferromagnetic layer.

40. A method as claimed in claim 39 wherein the pinning layer is formed of platinum manganese (PtMn).

41. A method as claimed in claim 40 including:
forming a second seed layer of nickel manganese oxide (NiMnO); and
forming a third seed layer of aluminum oxide (Al$_2$O$_3$) with the second seed layer located between the first and third seed layers.

42. A method as claimed in claim 37 wherein the method forms the pinned layer structure as an antiparallel (AP) pinned layer structure which comprises the steps of:
forming first and second ferromagnetic AP pinned layers; and
forming an AP coupling layer between the first and second AP pinned layers.

43. A method as claimed in claim 42 wherein the pinning layer is formed of platinum manganese (PtMn).

44. A method as claimed in claim 43 including:
forming a second seed layer of nickel manganese oxide (NiMnO); and
forming a third seed layer of aluminum oxide (Al$_2$O$_3$) with the second seed layer located between the first and third seed layers.

* * * * *